United States Patent
Putman et al.

(10) Patent No.: US 12,153,414 B2
(45) Date of Patent: Nov. 26, 2024

(54) IMITATION LEARNING IN A MANUFACTURING ENVIRONMENT

(71) Applicant: Nanotronics Imaging, Inc., Cuyahoga Falls, OH (US)

(72) Inventors: Matthew C. Putman, Brooklyn, NY (US); Andrew Sundstrom, Brooklyn, NY (US); Damas Limoge, Brooklyn, NY (US); Vadim Pinskiy, Wayne, NJ (US); Aswin Raghav Nirmaleswaran, Brooklyn, NY (US); Eun-Sol Kim, Cliffside Park, NJ (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 207 days.

(21) Appl. No.: 17/652,607

(22) Filed: Feb. 25, 2022

(65) Prior Publication Data
US 2022/0269254 A1   Aug. 25, 2022

Related U.S. Application Data

(60) Provisional application No. 63/153,811, filed on Feb. 25, 2021.

(51) Int. Cl.
*G05B 19/423*   (2006.01)
(52) U.S. Cl.
CPC ................. *G05B 19/423* (2013.01)
(58) Field of Classification Search
CPC ........ G05B 19/423; G05B 2219/39298; G05B 2219/40391; G05B 19/42; B25J 9/1664; G06N 3/008; G06N 3/08
See application file for complete search history.

(56) References Cited

U.S. PATENT DOCUMENTS 9,592,608 B1 * 3/2017 Bingham ............. G05B 19/423
10,842,578 B2   11/2020 Hashimoto et al.
(Continued)

FOREIGN PATENT DOCUMENTS

JP   2010005761 A   1/2010
JP   2010201611 A   9/2010
(Continued)

OTHER PUBLICATIONS

PCT International Application No. PCT/US22/17943, International Search Report and Written Opinion of the International Searching Authority, dated Jun. 9, 2022, 9 pages.
(Continued)

*Primary Examiner* — Khoi H Tran
*Assistant Examiner* — Tien Minh Le
(74) *Attorney, Agent, or Firm* — DLA PIPER LLP (US)

(57) ABSTRACT

A computing system identifies a trajectory example generated by a human operator. The trajectory example includes trajectory information of the human operator while performing a task to be learned by a control system of the computing system. Based on the trajectory example, the computing system trains the control system to perform the task exemplified in the trajectory example. Training the control system includes generating an output trajectory of a robot performing the task. The computing system identifies an updated trajectory example generated by the human operator based on the trajectory example and the output trajectory of the robot performing the task. Based on the updated trajectory example, the computing system continues to train the control system to perform the task exemplified in the updated trajectory example.

20 Claims, 7 Drawing Sheets

(56) References Cited

U.S. PATENT DOCUMENTS

| | | | |
|---|---|---|---|
| 11,203,362 B1 | 12/2021 | Beijbom et al. | |
| 2012/0139925 A1 | 6/2012 | Wang et al. | |
| 2015/0306761 A1* | 10/2015 | O'Connor | G06N 3/049 |
| | | | 700/250 |
| 2017/0190051 A1 | 7/2017 | O'Sullivan et al. | |
| 2019/0091859 A1* | 3/2019 | Wen | B25J 9/163 |
| 2019/0135300 A1* | 5/2019 | Gonzalez Aguirre | G06N 20/00 |
| 2019/0291277 A1* | 9/2019 | Oleynik | B25J 9/1669 |
| 2020/0384639 A1* | 12/2020 | Rozo | B25J 9/163 |
| 2020/0409379 A1* | 12/2020 | Takahashi | G06N 3/008 |
| 2022/0105624 A1* | 4/2022 | Kalakrishnan | B25J 9/163 |
| 2023/0089978 A1* | 3/2023 | Pulver | G05D 1/0246 |
| | | | 701/26 |

FOREIGN PATENT DOCUMENTS

| | | | |
|---|---|---|---|
| JP | 2018051652 A | 4/2018 | |
| JP | 2021009466 A | 1/2021 | |

OTHER PUBLICATIONS

Demura S., et al., "An Acquisition of Trajectory Generation Method for Tool Operation Based on MITATE from Human Demonstration," Proceedings of the 2018 JSME Conference on Robotics and Mechatronics Conference, Jun. 2018, 4 pages.

Office Action for Japanese Patent Application No. 2023-551134, mailed Oct. 11, 2024, 8 pages.

\* cited by examiner

IMITATION LEARNING IN A MANUFACTURING ENVIRONMENT

CROSS-REFERENCE TO RELATED APPLICATIONS

This application claims priority to U.S. Provisional Application Ser. No. 63/153,811, filed Feb. 25, 2021, which is hereby incorporated by reference in its entirety.

FIELD OF DISCLOSURE

The present disclosure generally relates to a system and method for implementing imitation learning in a manufacturing environment.

BACKGROUND

Since the dawn of the industrial revolution in the $18^{th}$ century, automation has governed the production of goods. Although today's factories have fully embraced automation as a core principle—with robots performing many repeatable tasks in high-production environments—many assembly tasks continue to be performed by humans. These tasks are difficult to automate due to cost, risk of critical failure, or logistics of deploying a robotic system to perform a task.

SUMMARY

A computing system identifies a trajectory example generated by a human operator. The trajectory example includes trajectory information of the human operator while performing a task to be learned by a control system of the computing system. Based on the trajectory example, the computing system trains the control system to perform the task exemplified in the trajectory example. Training the control system includes generating an output trajectory of a robot performing the task. The computing system identifies an updated trajectory example generated by the human operator based on the trajectory example and the output trajectory of the robot performing the task. Based on the updated trajectory example, the computing system continues to train the control system to perform the task exemplified in the updated trajectory example.

In some embodiments, a non-transitory computer readable medium is disclosed herein. The non-transitory computer readable medium includes one or more sequences of instructions, which, when executed by a processor, causes a computing system to perform operations. The operations include identifying, by the computing system, a trajectory example generated by a human operator. The trajectory example includes trajectory information of the human operator while performing a task to be learned by a control system of the computing system. The operations further include, based on the trajectory example, training, by the computing system, the control system to perform the task exemplified in the trajectory example. Training the control system includes generating an output trajectory of a robot performing the task. The operations further include identifying, the computing system, an updated trajectory example generated by the human operator based on the trajectory example and the output trajectory of the robot performing the task. The operations further include, based on the updated trajectory example, continuing, by the computing system, to train the control system to perform the task exemplified in the updated trajectory example.

In some embodiments, a system is disclosed herein. The system includes a processor and a memory. The memory has programming instructions stored thereon, which, when executed by the processor, causes the system to perform operations. The operations include identifying a trajectory example generated by a human operator. The trajectory example includes trajectory information of the human operator while performing a task to be learned by a control system. The operations further include, based on the trajectory example, training the control system to perform the task exemplified in the trajectory example. Training the control system includes generating an output trajectory of a robot performing the task. The operations further include identifying an updated trajectory example generated by the human operator based on the trajectory example and the output trajectory of the robot performing the task. The operations further include, based on the updated trajectory example, continuing to train the control system to perform the task exemplified in the updated trajectory example.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
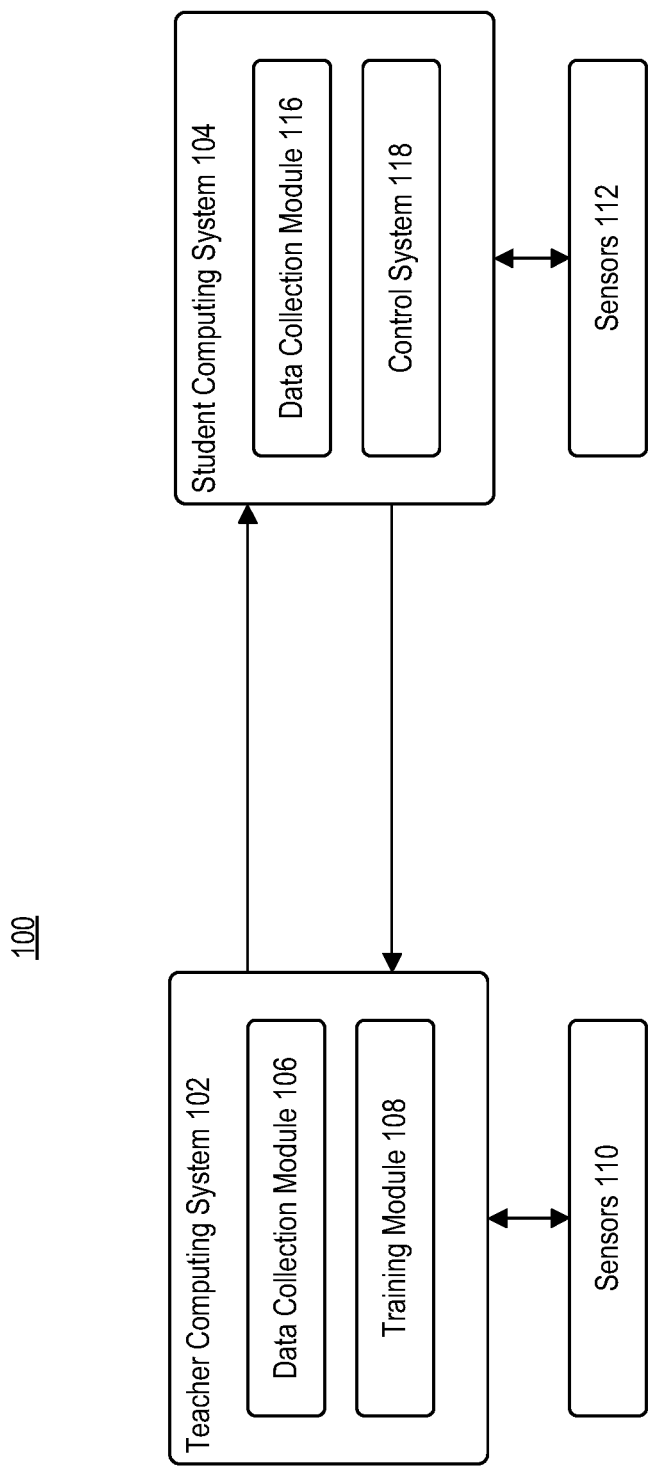
FIG. 1 is a block diagram illustrating a computing environment, according to example embodiments.

Imitation learning is a growing umbrella of methods to train robotic systems to closely mimic human activity in operation, allowing for encoding of motion to be done fast, more generically, and for existing processes. Imitation learning escapes from the traditional translation step of converting human based standard operating protocols into robotic programming logic. This translation is imperfect, however, and carries the intrinsic difficulty of identifying the principal motion components in each action frame and determining the intention behind specific motions.

For industrial applications, the action space is narrower than, for example, it is with autonomous driving; however, the need to achieve higher efficiency and yield is greater for industrial applications. In the industrial context, for example, the goal may be to encode robotic motion from existing or actively collected processes, such that the robot can perform the same procedure without the need for human intervention on the production line. Moreover, the goal is to prevent the need for downstream or upstream protocols to be altered or an exception to be added to the product check-out. The process of enabling the robotic system to be a drop-in for human operators may require high fidelity of operation and the accounting for many conditions that might not be intrinsically known. Though simulation environments may be effective in the development of learning strategies, they are ill suited to capture the myriad of variables associated with real-world processes and are of limited use for practical improvement of ground truth procedures.

To account for the current limitations in imitation learning, one or more techniques described herein provide a new approach to the foregoing set of problems by forcing a human operator (e.g., a teacher) to be dynamic in the inherent action space and to adjust their operation protocol (SOP) according to the limitations of the robotic operator (e.g., a student). The present approach may use the guidance of the traditional teacher-student relationship, by which the unsuccessful teacher is defined as one who "teaches to themselves" and assumes a set of skills, prior knowledge, and experience that the actual student does not possess. Instead, a successful teacher-student relationship may be defined as the same teacher adjusting their procedures and approach based on the performance of the student and the intuitive understanding of the student's limitations.

In some embodiments, the one or more techniques described herein may maintain the overarching static inputs and outputs of a processing station, as defined by the SOP, and may provide feedback to the human operator to change their approach to the outlined tasks. Fluid actions, such as the angle of approach to grasp a tool, the type of tool used, the order of operations, and other parts of the process that are performed through habit and not as important as strategic items, may be altered without sacrificing efficiency, while also improving the learning rate and fidelity of the robotic operations.

In some embodiments, an operator may iteratively remap its own action space onto the action space of the robotic system. The hybrid active-teaching/active learning approach may suggest a way to continuously improve the performance of the robotic system concurrently with, and co-dependent upon, continuously adapting the human operator's motion profile to more closely match the intrinsic limitations of the robotic system.

Such approach may create a dual-reward structure, by which the operator may be rewarded for the completion of their primary task—as measured by adherence and compliance to the SOP—and the ability of their actions to be understood by the robotic manipulator. By continuously providing feedback from the robotic system in training to the operator, the present approach seeks to apply direct changes to the operator behavior to reduce the environmental noise and classification problems that limit successful robotic training. The present process may be used for the introduction of robotic manipulators into existing production lines for auxiliary operations, improving handover tasks, and retraining for new products and procedures. The present approach does not necessitate robotic replacement of operators, but instead facilitates the efficient use of both resources by streamlining the training process.

FIG. 1 is a block diagram illustrating a computing environment 100, according to example embodiments. As shown, computing environment 100 may include a teacher computing system 102 and a student computing system 104 via one or more communication channels. In some embodiments, the one or more communication channels may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN.

Teacher computing system 102 may be operated by a user or administrator. For example, teacher computing system 102 may be a mobile device, a tablet, a desktop computer, or any computing system having the capabilities described herein. More specifically, teacher computing system 102 may be associated with a "teacher" in a teacher-student imitation learning paradigm.

Teacher computing system 102 may include at least data collection module 106 and training module 108. Each of data collection module 106 and training module 108 may be comprised of one or more software modules. The one or more software modules may be collections of code or instructions stored on a media (e.g., memory of computing systems associated with teacher computing system 102) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions Data collection module 106 may be configured to receive or retrieve data from one or more sensors 110 in communication with teacher computing system 102. For example, sensors 110 may be configured to monitor a human operator, or teacher, performing a process to be learned by student computing system 104. Using more specific example, sensors 110 may be configured to monitor a human operator placing a substrate on a pedestal of an inspection system. Sensors 110 may collect various data related to the process, such as, but not limited to images or videos of the human operator, angles related to the joints of the human operator, motion data related to the human operator, and the like. Generally, sensors 110 may collect data related to a human operator performing the same process multiple times in multiple different ways.

Training module 108 may be configured to train a neural network for deployment to student computing system 104. For example, training module 108 may be configured to generate a teacher policy from which student computing system 104 may learn to perform the target process.

Student computing system 104 may be associated with an agent. In some embodiments, an agent may refer to a robot. Student computing system 104 may be representative of a mobile device, a tablet, a desktop computer, or any computing system having the capabilities described herein. More specifically, student computing system 104 may be associated with a "student" in a teacher-student imitation learning paradigm.

Student computing system 104 may include at least data collection module 116 and control system 118. Each of data collection module 116 and control system 118 may be comprised of one or more software modules. The one or more software modules may be collections of code or instructions stored on a media (e.g., memory of computing systems associated with student computing system 104) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data collection module 116 may be configured to receive or retrieve data from one or more sensors 112 in communication with student computing system 104. For example, sensors 112 may be configured to monitor an agent, or robot, executing a process inferred from the teacher's process. Using more specific example, sensors 112 may be configured to monitor a robot imitating the human operator's steps of placing a substrate on a pedestal of an inspection system. Sensors 112 may collect various data related to the process, such as, but not limited to images or videos of the agent, angles related to components of the agent, motion data related to the agent, and the like.

Control system 118 may be configured to learn how to imitate the process performed by the teacher. Control system 118 may instruct, for example, a robot to perform certain actions based on data received or retrieved by sensors 112 during operation. For example, based on an indication that the robot picked up a substrate from sensors 112, control system 118 may send a signal to the robot to perform the next step in the process of placing the substrate on a pedestal of the inspection system.

As provided above, teacher computing system 102 and student computing system 104 may employ a bidirectional teacher student training process. For example, the learning process may include a forward component and a backwards component. The forward component may accomplish translation from the teacher's behavior, expressed in the teacher's native action space, into the student's behavior, expressed in the student's native action space. The backward component may provide feedback from the student to the teacher that iteratively modifies the training dataset the teacher may provide to the student, which unlocks a state subspace for the student to discover.

As part of the bidirectional teacher student training process, student computing system 104 may employ a forward-backward-DAGGER algorithm based on the original DAGGER algorithm. The forward-backward-DAGGER algorithm improves upon the original DAGGER algorithm by addressing a disparity between a higher-dimensional action space of the teacher and the lower-dimensional action space of the student, given that the teacher can only teach or provide an expert policy in its higher-dimensional action space, which is true in most real-world situations.

In forward-backward-DAGGER, the teacher and student policies, embedded in their respective action spaces, are encoded in function approximators. An initial student policy, for example, at random from those policies having the appropriate action space.

To train student computing system 104 to learn and perform well in the environment with their constrained action space, forward-backward-DAGGER may guide aggregation of data in the student's action space. This aggregated data can be used to improve student computing system 104. Critically, feedback from the student may be reported to the teacher. This feedback may assist the teacher to guide the student to aggregate new, better data in future iterations, which may guide the student's learning.

In the context of industrial robotics control, humans are known to produce actions in a high-dimensional actions space. When they attempt to teach a robot a specific task (e.g., to open a can of soda), humans perform sequences of actions that are closer to the robot's capability in reproducing those actions. Often, the robot's actions fall significantly short of reproducing the expected human behavior. This is because the human's actions are from a higher-dimensional action space that is often discretized into dimensions closer to those of the robot's action space.

To assist the robot to learn the human's original behavior, the human needs to modify its own behavior. This process requires feedback from the robot. The resulting modified human behavior, when shared with the robot, can guide the robot to behaviors that more successfully imitate the human.

In the current context, student computing system 104 may provide teacher computing system 102 with feedback, such that teacher computing system 102 can generate a policy or perform a series of steps that more closely aligns to actions or behaviors reproducible in the action space of student computing system 104.

Figure 2:
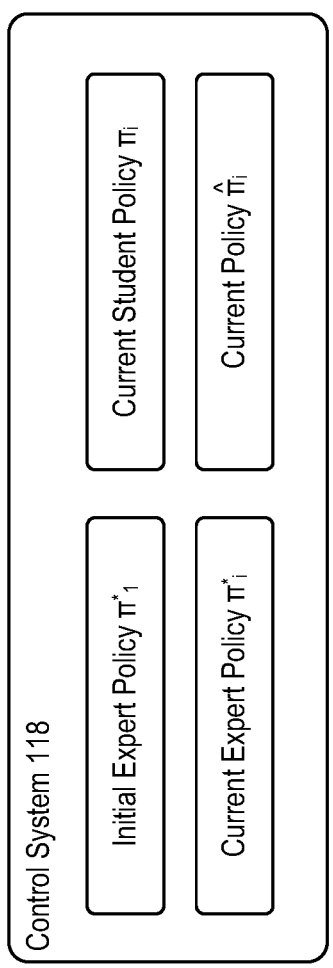
FIG. 2 is a block diagram illustrating a control system, according to exemplary embodiments.

FIG. 2 is a block diagram illustrating forward-backward-DAGGER, according to example embodiments.

At a high level, forward-backward-DAGGER is intended to provide value when the action spaces of the student and the teacher are distinct. For every possible trajectory sampled from the environment, a reward may be observed similar to rewards in a reinforcement learning problem. The sum of rewards of the whole trajectory can be calculated using R.

The expert policy with high-dimensional action space may be encoded using a function approximator. The student policy at a given iteration may be initialized using the expert policy and the learning observed by the student policy in the previous iteration. The student policy, when updated, may be used to sample a new trajectory that is aggregated in a data buffer. A new understanding of this data buffer may be approximated using a classifier. In some embodiments, the classifier may be representative of a scoring model/value function of the state action trajectory.

A Gaussian of the expert policy distribution may be used as the next version of the expert policy network. This step may act as an exploration aspect that may help the student. This cycle may be repeated until a student who is closer to the initial expert policy, while also securing higher rewards, is chosen as the best candidate who can perform well using the lower-dimensional action space.

The guidance provided by the expert policy at every iteration may be using a Gaussian distribution implemented as a dropout function on the neural network. The Gaussian distribution can be replaced with any other function that can cause exploration of the expert policy.

In some embodiments, forward-backward-DAGGER may be implemented as a single graph containing four different neural networks: $\pi^*_1$, $\pi^*_i$, $\pi_i$, and $\hat{\pi}_i$.

An initial expert policy network, $\pi^*_1$, may be generated by collecting initial expert trajectory data from a human and encoding that initial expert trajectory data into the initial expert policy network, $\pi^*_1$. For example, in some embodiments, sensors 110 may capture initial expert trajectory data from a human performing a target process. Teacher computing system 102 may provide the initial expert trajectory data to student computing system 104. In some embodiments, rather than sensors 110 providing the initial expert trajectory data to teacher computing system 102, sensors 110 may provide the initial expert trajectory data directly to student computing system 104. The initial expert policy network, $\pi^*_1$, may be stored in a memory associated with student computing system 104. For example, to facilitate easier and faster weight transfer, the weights of initial expert policy network, $\pi^*_1$ may be held in memory. In some embodiments, the reproducibility of the expert trajectory by the expert policy may be validated before application in forward-backward-DAGGER.

A current expert policy, $\pi^*_i$, may be initialized with the initial expert policy, $\pi^*_1$. At any given iteration, current expert policy, $\pi^*_i$, may be evolved to share the weight information from both the previous iteration of current expert policy, $\pi^*_i$, and the initial expert policy, $\pi^*_1$. Such approach may provide a collective understanding of the exploration done by the current expert policy while still revolving around the initial expert policy, $\pi^*_1$, dictated by a human teacher. Additionally, current expert policy, $\pi^*_i$, may be the key generator of exploratory trajectories that are helping the student learn the environment in its low dimensionality actions space.

Current policy, $\pi_i$, may be representative of the student policy. For example, current policy, $\pi_i$, may be used by control system 118 for adapting and interacting with the environment. In some embodiments, current policy, $\pi_i$, may inherit information from the exploratory current expert policy, $\pi^*_i$, and the generalized current policy, $\hat{\pi}_i$. Current policy, $\pi_i$, may be designed to sample the environment and participate in the data aggregation process. However, current policy, $\pi_i$ does not generate any human or expert labels, thus facilitating the automation of the forward-backward-DAGGER algorithm.

Generalized current policy, $\hat{\pi}_i$, may be representative of the actual learner that generalizes on the aggregated dataset. The best performing network upon validation will be returned as the student who performs well in its low-dimensional state.

Figure 3:
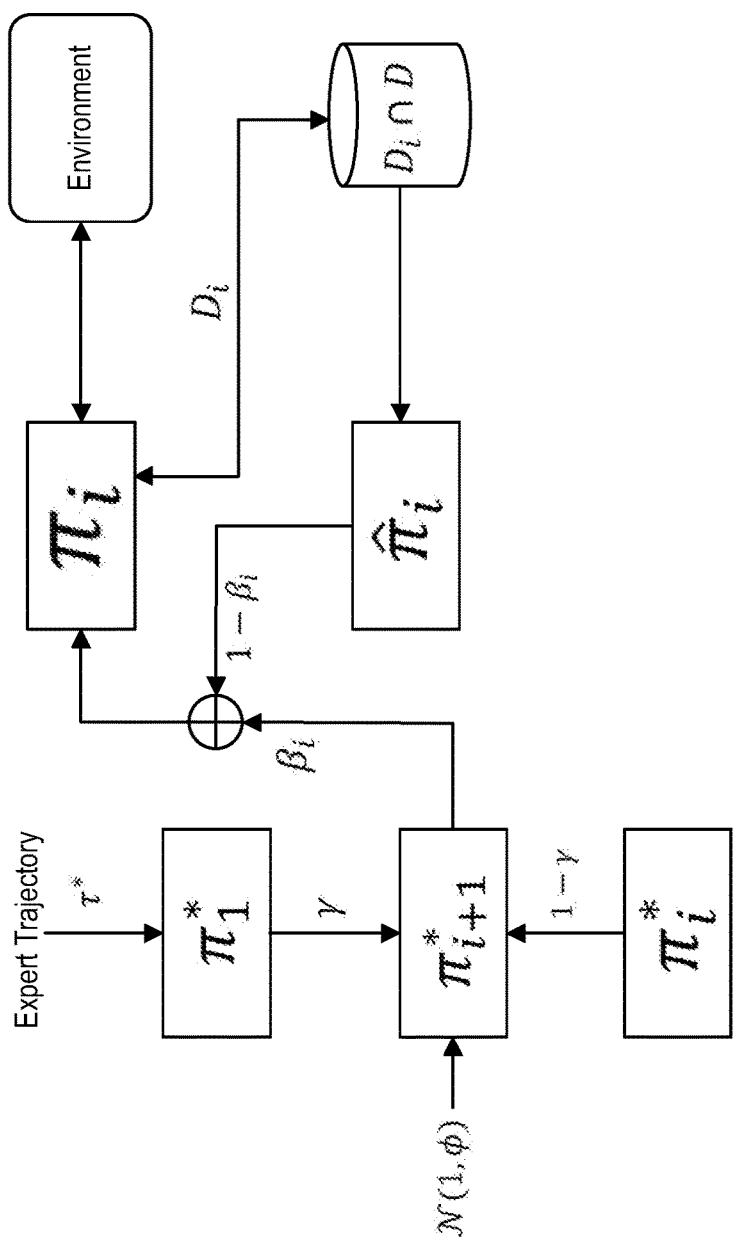
FIG. 3 is a block diagram illustrating a schematic of forward-backward-data DAGGER, according to example embodiments.
Figure 4:
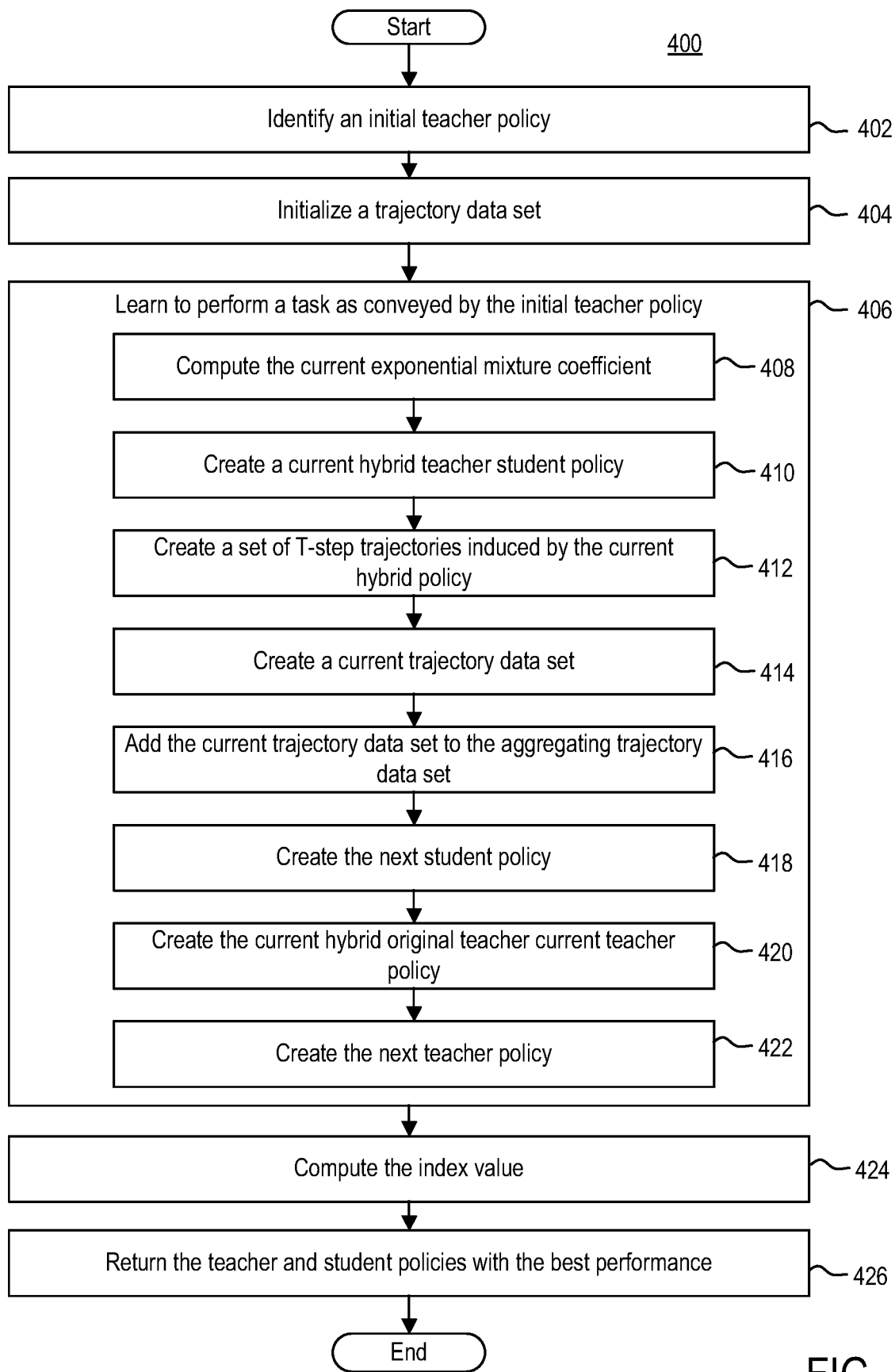
FIG. 4 is a flow diagram illustrating a method of training a control system to perform a process, according to example embodiments.

FIG. 3 is a block diagram illustrating a schematic 300 of forward-backward-data DAGGER, according to example embodiments. FIG. 4 is a flow diagram illustrating a method 400 of training a control system 118 to perform a process, according to example embodiments.

In operation, it is generally assumed that the teacher and student have distinct action spaces. For purposes of this discussion, the teacher policy may be represented as $\pi^*$ and the student policy mat be represented as $\hat{\pi}$. Accordingly, the action space of the teacher may be represented as $\mathcal{A}(\pi^*)$; the action space of the student may be represented as $\mathcal{A}(\hat{\pi})$. To validate a given policy, a sum-of-rewards function, R, may be used. As input, the sum-of-rewards function, R, may receive a data set of trajectories induced by that policy; as output, the sum-of-rewards function, R, may be a real number sum-of-rewards accrued to the input trajectories. In a given policy setting, an administrator or operator may know, a priori, the minimum and maximum possible sum-of-rewards, $R_{min}$ and $R_{max}$.

The process may begin at step 402 with the initial teacher policy, $\pi^*$. The initial teacher policy may include two mixture parameters, $\alpha, \gamma \in \mathbb{R} \cap [0,1]$. The $\alpha$ parameter may control how the current teacher policy, $\pi^*_i$, and current student policy, $\hat{\pi}_i$, are combined into the current hybrid policy, $\pi_i$. The $\alpha$ parameter may be used as the base in an exponential decay function, $\beta_i = \alpha^{i-1}$, that may specify the precipitously decreasing significance of the teacher policy, $\pi^*_i$, in the hybrid policy, $\pi_i$, relative to the student policy, $\hat{\pi}_i$, from one iteration to the next. The $\gamma$ parameter may linearly control how the respective initial teacher policy, $\pi^*_1$, and current teacher policy, $\pi^*_i$, may be combined into the next teacher policy, $\pi^*_{i+1}$.

At step 404, control system 118 may initialize the trajectory data set, D, to empty. Control system 118 may set the initial teacher policy, $\pi^*_1$, and the initial student policy, $\hat{\pi}_1$ from the set of student policies, $\hat{\Pi}$.

At step 406, control system 118 may learn how to perform a task as conveyed by the initial teacher policy, $\pi^*$. For example, Control system 118 may iterate N times over the following, indexing on i, where i may have the initial value of 1. Step 406 may include steps 408-422.

At step 408, control system 118 may compute the current exponential mixture coefficient, $\beta_i$, where $\beta_i = \alpha^{i-1}$. At step 410, control system 118 may then create the current hybrid teacher-student policy, $\pi_i$, from an exponentially weighted mixture of the current teacher policy, $\beta_i \pi^*_i$, and the current student policy, $(1-\beta_i)\hat{\pi}_i$.

At step 412, control system 118 may create a set of T-step trajectories induced by the current hybrid policy, $\mathcal{T}_{\pi_i}$. At step 414, control system 118 may create the current trajectory data set, $D_i$, of state-action pairs from the states in the current hybrid policy, $\mathcal{T}_{\pi_i}$. At step 416, control system 118 may add the current trajectory data set, $D_i$, to the aggregating trajectory data set, D.

At step 418, control system 118 may create the next student policy, $\hat{\pi}_{i+1}$, from the classifier trained on D. Let $\rho \in \mathbb{R} \cap [0,1]$ be the normalized sum-of-rewards based on $D_i$, which may be treated as a probability signifying how successful the current hybrid policy, $\pi_i$, imitated the teacher's original policy, $\pi^*_1$. Let $\phi$ be a sigmoid function of $$\frac{1-\rho}{\rho}$$

that smoothly decreases from 1→0 so that it is well behaved as $\rho \rightarrow R_{min}$.

At step 420, control system 118 may create the current hybrid original-teacher-current-teacher policy $\tilde{\pi}^*$ from a linearly weighted mixture of the initial teacher policy, $\gamma \pi^*_1$, and the current teacher policy, $(1-\gamma)\pi^*_i$. This formulation may allow one to specify the persistence of the original teacher policy in the evolution of the teacher policy.

At step 422, control system 118 may create the next teacher policy, $\pi^*_{i+1}$, by randomly selecting from the space around the current hybrid original-teacher-current-teacher policy, $\tilde{\pi}$, on the basis of how well the current hybrid teacher-student policy, $\pi_i$, performed, quantified as $\rho$ and $\phi$, described above, and characterized by a Gaussian-sampled multiplier $\mathcal{N}(1,\phi)$. In some embodiments, the Gaussian-sampled multiplier may be representative of the addition of injected noise into the teacher policy. For example, at every iteration of i, the teacher policy $\pi^*_i$, can be injected with Gaussian noise. For example, data sampling using $\pi_i = \beta_i \pi^*_i + (1-\beta_i)\hat{\pi}_i$ is expected to overcome issues related to instability.

The Gaussian noise injected into the teacher can be expected to cause exploratory effects on the student policy since data aggregation may be done using $\pi_i = \beta_i \pi^*_i + (1-\beta_i)\hat{\pi}_i$. These exploratory effects can be expected to cause the student policy, constrained by its own action space dimensionality, to visit states whose $P(s \in S|\hat{\pi}_i)$ is low.

Once the iteration on i from 1 to N is complete, at step 424, control system 118 may compute the index value, i*, whose trajectory data set, $D_{i*}$, gives the maximum sum-of-rewards, $R(D_{i*})$. At step 426, control system 118 may return the teacher and student policies whose index is i*: $\{\pi^*_i, \hat{\pi}^*_i\}$.

Figure 5:
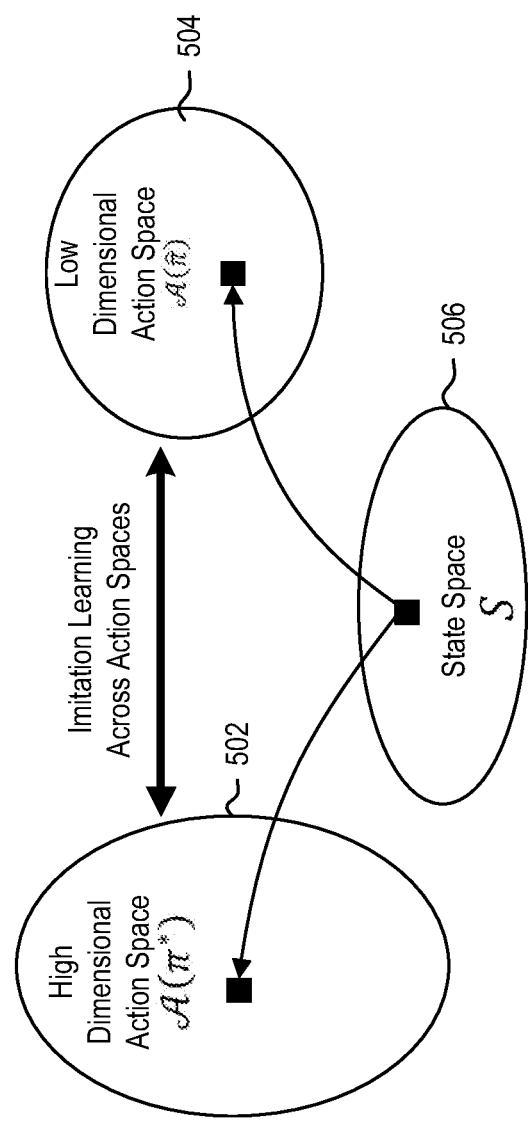
FIG. 5 is a block diagram illustrating actions spaces of the teacher and student, according to example embodiments.

FIG. 5 is a block diagram 500 illustrating actions spaces of the teacher and student, according to example embodiments. As shown, block diagram 500 may include a high-dimensional action space $\mathcal{A}(\pi^*)$ 502, a low-dimensional action space $\mathcal{A}(\hat{\pi})$ 504, and a state space S 506. In a conventional imitation learning scenario, an expert policy is imitated in a given action space A that is equivalent for both the teacher $\pi^*$ and the student $\hat{\pi}$. In comparison, the current approach, as illustrated in FIG. 5, imitation of high-dimensional actions may be used to learn the policy for a low-dimensional action space. With a known mapping between state space S and high-dimensional action space $\mathcal{A}(\pi^*)$, a feedback can be used to guide exploration of the low-dimensional action space $\mathcal{A}(\hat{\pi})$ to find a good policy.

Figure 6:
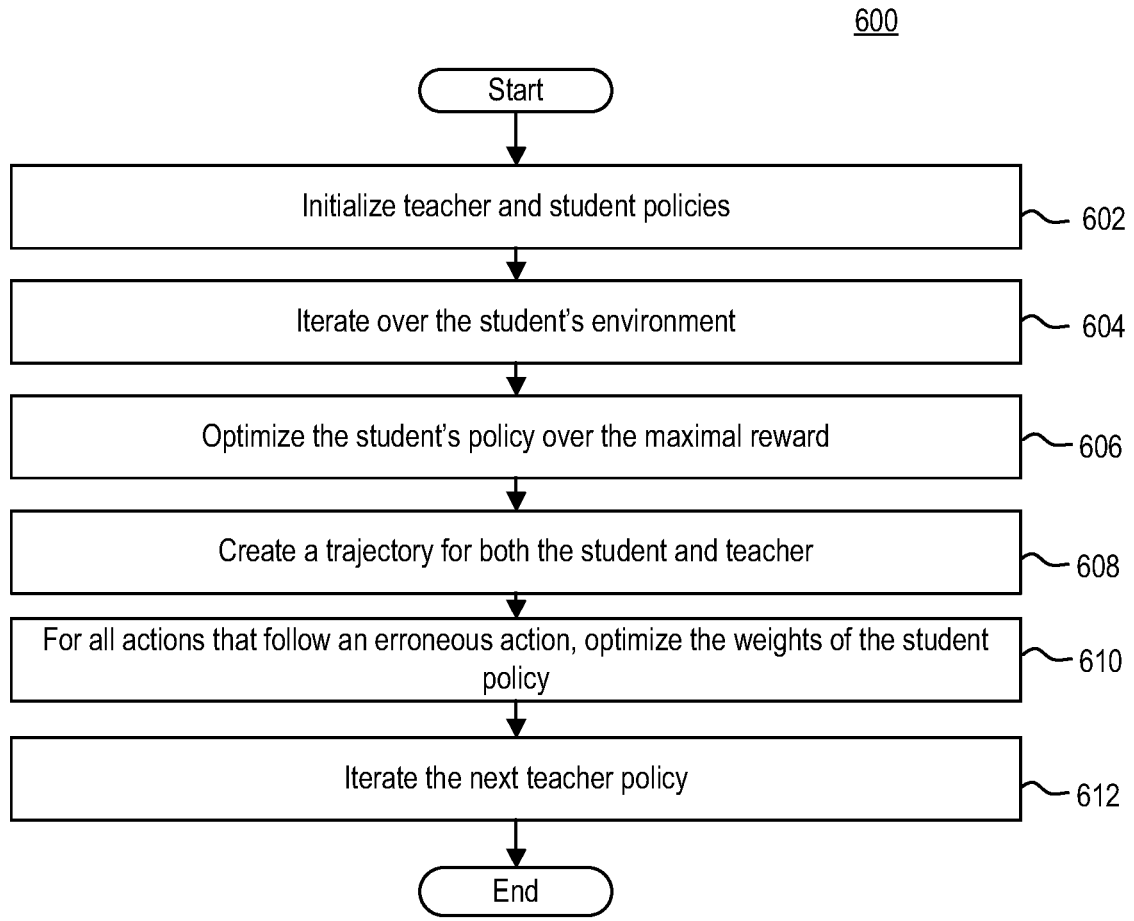
FIG. 6 is a flow diagram illustrating an imitation learning process, according to example embodiments.

FIG. 6 is a flow diagram illustrating an imitation learning process 600, according to example embodiments.

As shown, at step 602, student and teacher policies may be initialized for a starting state. In some embodiments, the student and teacher policies are assumed to operate over distinct action spaces.

At step 604, the student may iterate over the student's environment a set number of times. For each iteration, the student may gather state-action-reward tuples for posterity.

At step 606, the student policy may be optimized over the maximal reward.

At step 608, a trajectory is created for both the student and teacher for the environment.

At step 610, for all actions of the trajectory that follow an erroneous action from the student compared to the teacher, the weights of the student policy may be optimized to minimize the deviation from the teacher trajectory.

At step 612, the system may iterate the next teacher policy. Such iteration may continue until a best or optimal teacher-student policy is returned.

Figure 7A:
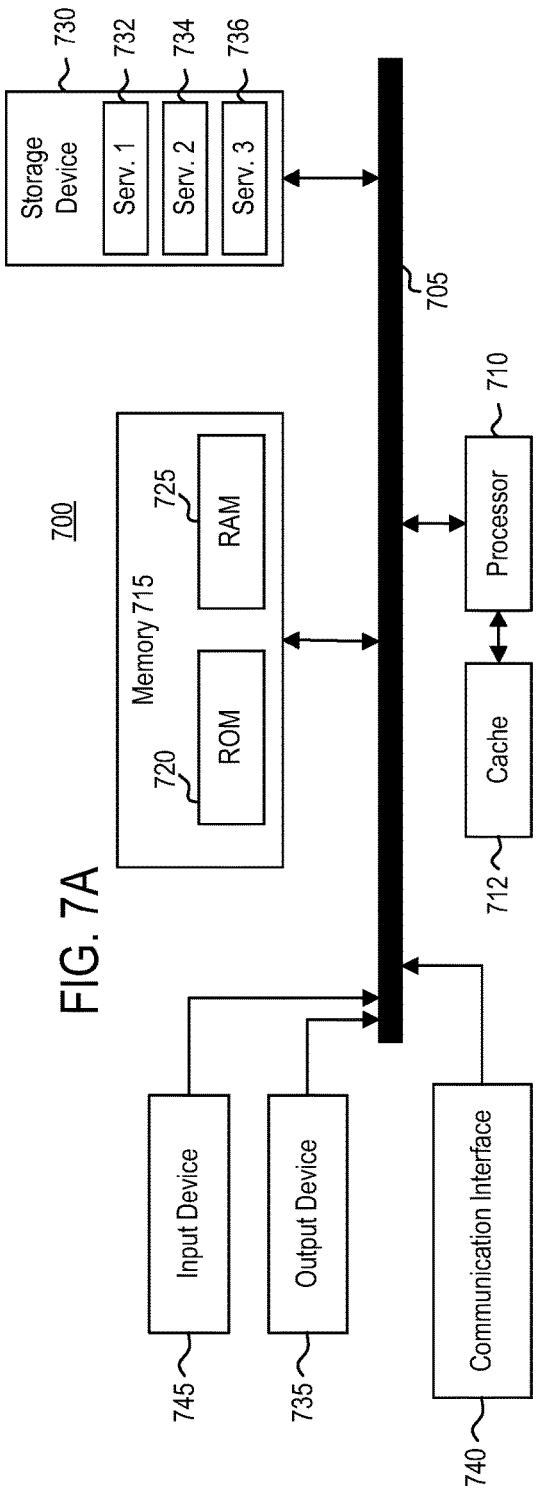
FIG. 7A is a block diagram illustrating a computing system, according to example embodiments.

FIG. 7A illustrates a system bus architecture of computing system 700, according to example embodiments. System 700 may be representative of at least a portion of student computing system 104. One or more components of system 700 may be in electrical communication with each other using a bus 705. System 700 may include a processing unit (CPU or processor) 710 and a system bus 705 that couples various system components including the system memory 715, such as read only memory (ROM) 720 and random access memory (RAM) 725, to processor 710. System 700 may include a cache of high-speed memory connected directly with, in close proximity to, or integrated as part of processor 710. System 700 may copy data from memory 715 and/or storage device 730 to cache 712 for quick access by processor 710. In this way, cache 712 may provide a performance boost that avoids processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general-purpose processor and a hardware module or software module, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing system 700, an input device 745 may represent any number of input mechanisms, such as a microphone for speech, a touch-sensitive screen for gesture or graphical input, keyboard, mouse, motion input, speech and so forth. An output device 735 (e.g., display) may also be one or more of a number of output mechanisms known to those of skill in the art. In some instances, multimodal systems may enable a user to provide multiple types of input to communicate with computing system 700. Communications interface 740 may generally govern and manage the user input and system output. There is no restriction on operating on any particular hardware arrangement and therefore the basic features here may easily be substituted for improved hardware or firmware arrangements as they are developed.

Storage device 730 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include services 732, 734, and 736 for controlling the processor 710. Other hardware or software modules are contemplated. Storage device 730 may be connected to system bus 705. In one aspect, a hardware module that performs a particular function may include the software component stored in a computer-readable medium in connection with the necessary hardware components, such as processor 710, bus 705, output device 735, and so forth, to carry out the function.

Figure 7B:
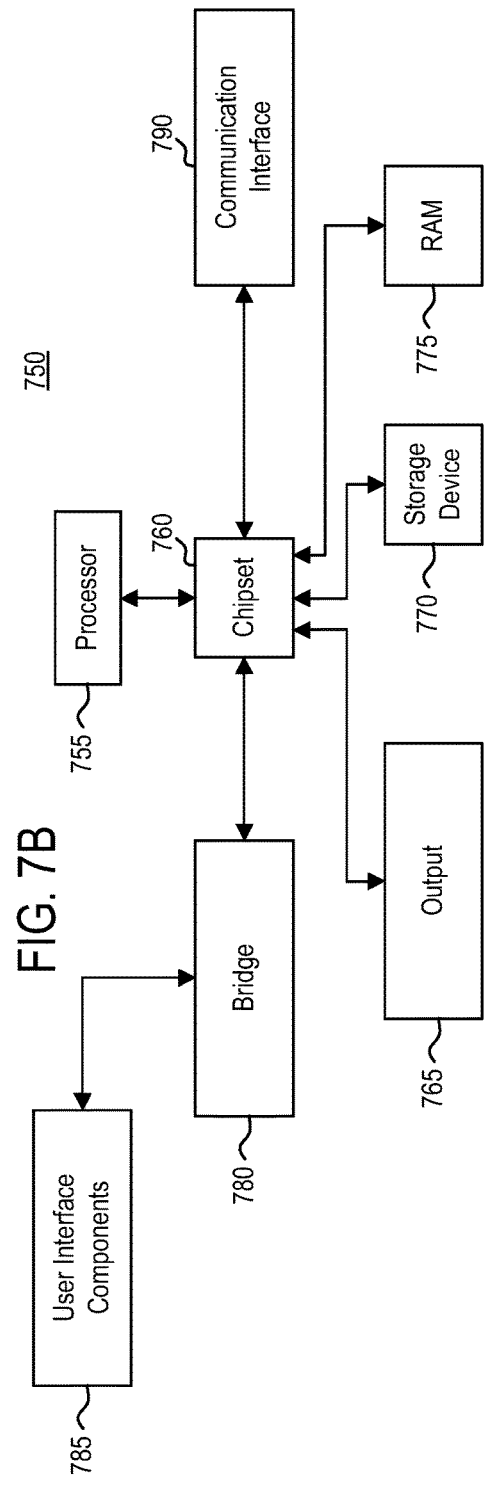
FIG. 7B is a block diagram illustrating a computing system, according to example embodiments.

FIG. 7B illustrates a computer system 750 having a chipset architecture that may represent at least a portion of student computing system 104. Computer system 750 may be an example of computer hardware, software, and firmware that may be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 outputs information to output 765, such as a display, and may read and write information to storage device 770, which may include magnetic media, and solid state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. In general, inputs to system 750 may come from any of a variety of sources, machine generated and/or human generated.

Chipset 760 may also interface with one or more communication interfaces 790 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 755 analyzing data stored in storage device 770 or RAM 775. Further, the machine may receive inputs from a user through user interface components 785 and execute appropriate functions, such as browsing functions by interpreting these inputs using processor 755.

It may be appreciated that example systems 700 and 750 may have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method for training a control system, comprising:
   receiving, by a computing system, an initial teacher policy based on a trajectory example generated by a human operator in a first action space, the trajectory example captured using one or more sensors monitoring movements of the human operator, the trajectory example comprising trajectory information of the human operator while performing a task to be learned by a control system of the computing system;
   based on the initial teacher policy, generating, by the computing system, an initial student policy by training the control system to perform the task exemplified in the trajectory example, wherein the control system exists is a second action space that is lower dimension from the first action space, wherein movements of the control system in the second action space are limited compared to movements of the human operator in the first action space, wherein training the control system comprises:
   causing the control system to mimic the movements of the human operator while performing the task, and monitoring the movements of the control system using sensors, and
   generating an output trajectory of the control system performing the task based on the monitored movements;
   providing, by the computing system, the output trajectory of the control system to the human operator for determining a reproducibility of the trajectory example based on the output trajectory generated by the control system;
   receiving, by the computing system, an updated teacher policy based on an updated trajectory example generated by the human operator responsive to the determined reproducibility of the trajectory example; and
   based on the updated teacher policy, generating, by the computing system, an updated student policy by training the control system to perform the task exemplified in the updated trajectory example.

2. The method of claim 1, wherein generating, by the computing system, the updated student policy by training the control system to perform the task exemplified in the updated trajectory example comprises:
   outputting an updated output trajectory of the control system performing the task.

3. The method of claim 2, further comprising:
   receiving, by the computing system, a further updated teacher policy comprising a further updated trajectory example generated by the human operator based on the trajectory example, the output trajectory, the updated trajectory example, and the updated output trajectory of the control system performing the task; and
   based on the further updated teacher policy, generating, by the computing system, a further updated student policy by training the control system to perform the task exemplified in the further updated trajectory example.

4. The method of claim 1, wherein the trajectory example is projected from a first environment in which the human operator performs the task into a second environment in which the control system performs the task, wherein the first environment is a higher dimensional environment than the second environment.

5. The method of claim 4, wherein the updated trajectory example is projected from the first environment in which the human operator performs the task into the second environment in which the control system performs the task.

6. The method of claim 1, further comprising:
   minimizing a distance between the task as performed by the human operator and the task as performed by the control system.

7. The method of claim 1, wherein the task is a manufacturing task.

8. A system comprising:
   a processor; and
   a memory having programming instructions stored thereon, which, when executed by the processor, causes the system to perform operations, comprising:
   receiving an initial teacher policy based on a trajectory example generated by a human operator in a first action space, the trajectory example captured using one or more sensors monitoring movements of the human operator, the trajectory example comprising trajectory information of the human operator while performing a task to be learned by a control system of the system;

based on the initial teacher policy, generating an initial student policy by training the control system to perform the task exemplified in the trajectory example, wherein the control system exists is a second action space that is lower dimension from the first action space, wherein movements of the control system in the second action space are limited compared to movements of the human operator in the first action space, wherein training the control system comprises:
   causing the control system to mimic the movements of the human operator while performing the task, and
   monitoring the movements of the control system using sensors, and
   generating an output trajectory of the control system performing the task based on the monitored movements;
providing the output trajectory of the control system to the human operator for determining a reproducibility of the trajectory example based on the output trajectory generated by the control system;
receiving an updated teacher policy based on an updated trajectory example generated by the human operator responsive to the determined reproducibility of the trajectory example; and
based on the updated teacher policy, generating an updated student policy by training the control system to perform the task exemplified in the updated trajectory example.

9. The system of claim 8, wherein generating the updated student policy by training the control system to perform the task exemplified in the updated trajectory example comprises:
outputting an updated output trajectory of the robot control system performing the task.

10. The system of claim 9, wherein the operations further comprise:
receiving a further updated teacher policy based on a further updated trajectory example generated by the human operator based on the trajectory example, the output trajectory, the updated trajectory example, and the updated output trajectory of the control system performing the task; and
based on the further updated teacher policy, generating a further updated student policy by training the control system to perform the task exemplified in the further updated trajectory example.

11. The system of claim 8, wherein the trajectory example is projected from a first environment in which the human operator performs the task into a second environment in which the control system performs the task, wherein the first environment is a higher dimensional environment than the second environment.

12. The system of claim 11, wherein the updated trajectory example is projected from the first environment in which the human operator performs the task into the second environment in which the control system performs the task.

13. The system of claim 8, wherein the operations further comprise:
minimizing a distance between the task as performed by the human operator and the task as performed by the control system.

14. The system of claim 8, wherein the task is a manufacturing task.

15. A non-transitory computer readable medium comprising one or more sequences of instructions, which, when executed by a processor, causes a computing system to perform operations comprising:
receiving, by a computing system, an initial teacher policy based on a trajectory example generated by a human operator in a first action space, the trajectory example captured using one or more sensors monitoring movements of the human operator, the trajectory example comprising trajectory information of the human operator while performing a task to be learned by a control system of the computing system;
based on the initial teacher policy, generating, by the computing system, an initial student policy by training the control system to perform the task exemplified in the trajectory example, wherein the control system exists is a second action space that is lower dimension from the first action space, wherein movements of the control system in the second action space are limited compared to movements of the human operator in the first action space, wherein training the control system comprises:
   causing the control system to mimic the movements of the human operator while performing the task, and
   monitoring the movements of the control system using sensors, and
   generating an output trajectory of the control system performing the task based on the monitored movements;
providing, by the computing system, the output trajectory of the control system to the human operator for determining a reproducibility of the trajectory example based on the output trajectory generated by the control system;
receiving, by the computing system, an updated teacher policy based on an updated trajectory example generated by the human operator responsive to the determined reproducibility of the trajectory example; and
based on the updated teacher policy, generating, by the computing system, an updated student policy by training the control system to perform the task exemplified in the updated trajectory example.

16. The non-transitory computer readable medium of claim 15, wherein generating, by the computing system, the updated student policy by training the control system to perform the task exemplified in the updated trajectory example comprises:
outputting an updated output trajectory of the control system performing the task.

17. The non-transitory computer readable medium of claim 16, further comprising:
receiving, by the computing system, a further updated teacher policy comprising a further updated trajectory example generated by the human operator based on the trajectory example, the output trajectory, the updated trajectory example, and the updated output trajectory of the control system performing the task; and
based on the further updated trajectory example, generating, by the computing system, a further updated student policy by training the control system to perform the task exemplified in the further updated trajectory example.

18. The non-transitory computer readable medium of claim 15, wherein the trajectory example is projected from a first environment in which the human operator performs the task into a second environment in which the control system performs the task, wherein the first environment is a higher dimensional environment than the second environment.

19. The non-transitory computer readable medium of claim 18, wherein the updated trajectory example is projected from the first environment in which the human operator performs the task into the second environment in which the control system performs the task.

20. The non-transitory computer readable medium of claim 15, further comprising:
- minimizing a distance between the task as performed by the human operator and the task as performed by the control system.

* * * * *